United States Patent [19]

Kleiner et al.

[11] 3,965,053

[45] June 22, 1976

[54] FOAMED POLYOLEFIN FOILS

[75] Inventors: Frank Kleiner, Cologne; Wolfgang Becker, Hilden; Karl Heinz Muller, Quadrath-Ischendorf, all of Germany

[73] Assignee: Bayer Aktiengesellschaft, Germany

[22] Filed: Jan. 9, 1975

[21] Appl. No.: 539,800

[30] Foreign Application Priority Data

Jan. 10, 1974 Germany.............................. 2401004

[52] U.S. Cl. .......................... 260/2.5 HA; 264/170; 264/211; 526/14; 526/20; 526/49
[51] Int. Cl.² ......................................... C08F 10/02
[58] Field of Search............... 260/2.5 HA, 94.9 GB; 264/170, 211

[56] References Cited
UNITED STATES PATENTS

| | | | |
|---|---|---|---|
| 2,345,570 | 4/1944 | Bley | 264/170 |
| 3,222,304 | 12/1965 | Ingram | 260/2.5 HA |
| 3,385,804 | 5/1968 | Hill et al. | 260/2.5 B |
| 3,467,706 | 9/1969 | Hill et al. | 260/561 |
| 3,627,723 | 12/1971 | Kealy et al. | 264/170 |
| 3,763,059 | 10/1973 | Needham et al. | 260/2.5 B |

*Primary Examiner*—John Kight, III
*Attorney, Agent, or Firm*—Connolly and Hutz

[57] ABSTRACT

A process for the continuous production of a foamed foil from a polymer based on an $\alpha,\beta$-monolefinically unsaturated monomer wherein 0.05 to 0.2 % by weight of a diamide obtained by reacting an aliphatic diamine and at least one aliphatic monocarboxylic acid having at least 4 carbon atoms is added to the solid or molten polymer in addition to the chemical blowing agent before or while the polymer is processed.

9 Claims, No Drawings

FOAMED POLYOLEFIN FOILS

This invention relates to a process for the production of foamed polyolefin foils, usng aliphatic diamides of aliphatic monocarboxylic acids.

Foils have been used to an increasing extent in recent years in the packaging industry. A high proportion of these foils are made of polyolefins and particularly polyethylene and its copolymers, e.g. with vinyl acetate. These foils have, however, a more or less waxy texture and many attempts have therefore been made to improve the texture without deleteriously affecting the other, advantageous properties.

Thus attempts have made to eliminate the waxy texture by providing the foil with a large number of tiny gas bubbles i.e. by foaming it. A soft material with a warm, pleasant texture and slightly metallic surface gloss is thereby obtained. This foil is no longer transparent or semi-opaque like the unfoamed foil but either completely opaque or only slightly transparent, depending on the degree of foaming, and pure white. The metallic effect can be enhanced by the addition of a small amount of pigment. Moreover by foaming the foil one can produce a foil which is thicker for a given weight than the unfoamed foil or lighter for a given thickness so that more square metres of foil can be produced from a given quantity of the polymer.

Numerous processes are known for the production of foamed foils. They mainly differ from each other only in the foaming agent or agents used. By using low boiling hydrocarbons the foaming is effected by evaporation and by using chemical blowing agents the foaming is produced by a gas or mixture of gases liberated. It is preferred to use chemical blowing agents because the foils can then be produced in conventional machines while physical bowing agents require special equipment. Moreover, chemical blowing agents, which are available in the form of powders, are easier to handle than the low boiling physical blowing agents (see C. J. Benning: Plastic Foams, Volume 1 (1968)).

Among the many known chemical blowing agents azodicarbonamide has proved to be particularly suitable for foaming polyolefins, in particular polyethylene, because it has a decomposition temperature of about 200°C which is suitable for the processing of polyethylene types of foils and it has a high gas yield of about 200 ml per gram of azodicarbonamide. Moreover, both the compound itself and its decomposition products are physiologically harmless.

Foamed foils are produced like compact foils by means of an extruder to which a blow head with an annular gap is attached (Plastics Handbook, volume IV "Polyolefins" by V. Vieweg, Schlag and Schwartz, C. Hauser publication, Munich 1969). In most cases, a mixture of polyethylene and 0.1 to 2 % by weight of azodicarbonamide is used instead of pure polyethylene. The mixture may be obtained by tumbling azodicarbonamide powder, with or without bonding agent onto the polyethylene granulate. It may be preferably obtained more homogeneously mixed by preparing a polyethylene-azodicarbonamide concentrate, a so-called master batch consisting e.g. of 70 parts by weight of polyethylene and 30 parts by weight of azodicarbonamide, which is added in the appropriate quantity to the polyethylene. Preferably very short die heads are used for this process and the smoothing or steadying zone normally provided at the annular outlet gap is also very much shortened or omitted. This enables a troublefree production of foamed polyethylene. Due to fluctuations in pressure, temperature and flow velocity of the melt, slight foaming of the marginal zones already occurs inside the machine. The foamy layer becomes pulverized by the shearing forces, mainly at the wall of the extruder, and the pulverized material sticks to the screw. It is gradually carried outwards by the screw so that it finally settles on the inside and outside of the die slot. Since the foam gets rubbed away unevenly round the whole internal circumference of the blow head, and the material which is rubbed away and settles in the machine slows down the flow of melt, the foil is ejected in jerks and consequently has annular surface markings and stripes. Furthermore, the pore structure varies constantly owing to pulsations in pressure. The foam is no longer uniform but has a disturbed cell structure. At first, the deposit on the die is periodically swept away by the moving foil, a phenomenon which is in itself sufficient to produce severe irregularities on the surface of the foam and to cause the layers of foil to stick together when rolled up. But, when the deposit has built up a sufficiently large collar on the inside of the annular gap, rupture of the foil takes place, which severely disturbs production and constitutes a real loss.

Although the deposit in the screw does not interfere with production, it does require additional cleaning time in labour.

It is an object of this invention to reduce or substantially to prevent these disturbances in order to achieve continuous production of polyolefin foils and to overcome the lack in quality of the foil caused by the said disturbances.

Since the difficulties are evidently mainly due to friction of the flowing melt against the wall of the extruder, it was suggested to reduce the friction by adding known lubricants such as oleic or erucasic acid amide and thus reduce or completely eliminate the pulverizing effect.

It was, however, found that, in order to produce any effect, these lubricants had to be added in such large quantities that they seriously interfered with the foaming process and caused collapse of the foam due to rupture of the cell walls. In addition, they have a promotor action which deleteriously affects the decomposition point of the blowing agent so that foaming is completely inhibited. Moreover, in many cases a film of lubricant forms between the metal wall and the fowing melt owing to accumulation of lubricant on the surface of the foil. The foil then becomes so slippery that it is impossible to handle it.

This invention relates to a process for the continuous production of foamed foils from polymers based on $\alpha,\beta$-monoolefinically unsaturated monomers by known foil blowing processes wherein 0.05 to 0.2 % by weight of a diamide obtained by reacting an aliphatic diamine and at least one aliphatic monocarboxylic acid having at least four carbon atoms is added to the solid or molten polymer in addition to the chemical blowing agent before or while the polymer is processed.

Preferably the polymer and its additives are mixed and the mixture is then processed in a screw extruder at a temperature of from 180° to 230°C, extruded through a blow head with an annular gap into the open air and the foil thus obtained optionally cut into two half, is rolled up.

Particularly shuitable diamides are those of the general formula I $$R^1-CO-NH-(CH_2)_n-NH-CO-R^2$$

in which $R^1$ and $R^2$, which may be the same or different, represent an alkyl or alkenyl group with 4 to 20 carbon atoms and $n$ denotes an integer of from 2 to 6. Diamides of ethylene diamine and a saturated or unsaturated fatty acid with 12 to 20 carbon atoms such as lauric, stearic or oleic acid are preferably used. The diamide of ethylene diamine and stearic acid is particularly preferred. Quantities of 0.05 to 0.2 % by weight, preferably 0.08 to 0.15 % by weight, based on the polymer, are sufficient to eliminate all disturbances in the continuous production of foils.

Addition of these diamides not only overcomes substantially all difficulties in the manufacture of the foils but also has the completely surprising effect of producing a non-slip foil. Polymers of $\alpha,\beta$-monoolefinically unsaturated monomers such as polymers of olefins containing 2 to 4 carbon atoms, preferably high pressure or low pressure polyethylene or copolymers of ethylene and up to 20 % by weight of vinyl esters, preferably up to 10 % by weight of vinyl acetate, are processed into foils by the inventive process.

Chemical blowing agents which are suitable to be added to the polymers before they are processed are those which have a decomposition point or range starting from about 190°C, such as azodicarbonamide or dinitroso pentamethylene tetramines, preferably azodicarbonamide, which is suitably added in quantities of 0.1 to 2 % by weight, based on the polymer.

According to the invention, the polymers are processed into nonslip foils which are particularly suitable for use as packaging material by the known method of blowing an extruded tube, using an extruder with blow head attached.

The parts given in the examples are in all cases parts by weight.

COMPARISON EXAMPLE 1

To 98 parts of a high pressure polyethylene having a density of 0.921 g/cm³ and a melt index of 3.5 g per 10 minutes at 190°C and 2.16 kp (=kilopond) loading were added 2 parts of a master batch consisting of 70 parts of the above polyethylene and 30 parts of azodicarbonamide, and the mixture was mixed in a tumbling barrel for 20 minutes.

It was then processed at 180°–230°C in a tube extrusion installation consisting of an extruder with an associated three-zone screw of conventional construction having a diameter of 60 mm and a length of 250 cm and operating at a compression of 1:3, and a blow head with an annular gap of 150 mm diameter and 0.8 mm width of gap to produce a foam foil.

The resulting foil 200 μm in thickness initially had a very uniform cell structure and silky matt, fault-free surfaces. After an extrusion time of about 30 minutes, a deposit settled on the inner and outer edge of the annular gap, and this deposit was carried long by the moving tubular foil in unequal amounts from time to time. The initially very uniform movement of the tube became progressively more disturbed and markings appeared on the surface of the foam foil due to the jerky movements, and after an extrusion time of 4 hours, the tube of foil tears off.

COMPARISON EXAMPLE 2

An ethylene copolymer with a vinyl acetate content of about 3.5 %, a density of 0.926 g/cm³ and a melt index of 0.35 g/10 minutes, 190°C 2.16 kp loading was processed into a foam foil as described in comparison example 1.

The same disturbances appeared. The foil finally broke off after an operating time of between 5½ and 6 hours.

COMPARISON EXAMPLE 3

A mixture was prepared as in Comparison Example 2 but in addition 0.12 % erucasic acid amide were tumbled onto the granulate in the tumbler barrel.

Extrusion was carried out as described in comparison example 1.

The foam foil had a good apperance but was so smooth that the squeezing rollers showed severe slippage from time to time which caused a jerky draw-off rate, wide fluctuations in the thickness of the foil and shattering marks on the surface of the foil. The foil was so smooth that it could not be rolled up but constantly slipped so that the experiment had to be stopped after about 2 hours. Although a deposit had settled on the extrusion die by that time, it was much less severe than in comparison examples 1 and 2.

EXAMPLE 1

A similar manner to that prepared in comparison Example 2 but with the addition of 0.12 % of ethylene diamine distearate was processed into a foam foil as described in comparison example 1.

The foil, which was completely satisfactory in its quality, moved exceptionally smoothly and completely free from jerks and could be rolled up without any trouble.

No deposit was found on the extrusion die even after an operating time of 8 hours.

EXAMPLE 2

2 parts of a master batch consisting of 64 parts of high pressure polyethylene with a density of 0.924 g/cm³ and a melt index of 3.5 g/10 minutes, 190°C at 2.16 lp loading, 30 parts of azodicarbonamide and 6 parts of ethylene diamine distearate were added to 98 parts of the copolymer used in comparison example 2, mixed in a tumbler barrel and processed to a foam foil as described in comparison example 1.

The experiment was carried out over a total of 32 hours without any formation of deposit on the die or anay other disturbance, let alone rupture of the foil. Even when the extruder screw was taken apart no deposit was found.

We claim:
1. A process for the continuous production of a foamed foil from a polymer based on an $\alpha,\beta$-monoolefinically unsaturated monomer, said process comprising adding 0.05–0.2% by weight, based on the polymer, of a diamide of the formula

$$R^1-CO-NH-(CH_2)_n-NH-CO-R^2$$

to said polymer in the solid or molten state either before or during foamed foil production by a chemical blowing agent, said $R^1$ and $R^2$, which may be the same or different, being alkyl or alkenyl having 4 to 20 carbon atoms and $n$ being an integer of from 2 to 6.

2. A process as claimed in claim 1, wherein from 0.08 to 0.15 % by weight of diamide is added to the polymer.

3. A process as claimed in claim 1, wherein the polymer is a polymer of an olefin containing 2 to 4 carbon atoms.

4. A process as claimed in claim 1, wherein the polymer is high or low pressure polyethylene or a copolymer of ethylene and up to 20 % by weight of vinyl ester.

5. A process as claimed in claim 4, wherein the polymer is a copolymer of ethylene and up to 10 % by weight of vinyl acetate.

6. A process as claimed in claim 1, wherein the chemical blowing agent has a decomposition point of about 190°C.

7. A process as claimed in claim 6, wherein the chemical blowing agent is azodicarbonamide or a dinitrosopentamethylene tetramine.

8. A process as claimed in claim 1, wherein the chemical blowing agent is used in a concentration of from 0.1 to 2 % by weight based on the polymer.

9. A foamed foil produced by a process as claimed in claim 1.

* * * * *